(12) United States Patent
Aldersley

(10) Patent No.: US 9,764,773 B2
(45) Date of Patent: Sep. 19, 2017

(54) LID, IN PARTICULAR TRUNK LID FOR A MOTOR VEHICLE, IN PARTICULAR A PASSENGER CAR

(71) Applicant: Bayerische Motoren Werke Aktiengesellschaft, Munich (DE)

(72) Inventor: Nicholas Aldersley, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/051,749

(22) Filed: Feb. 24, 2016

(65) Prior Publication Data

US 2016/0167714 A1   Jun. 16, 2016

Related U.S. Application Data

(63) Continuation of application No. PCT/EP2014/073997, filed on Nov. 7, 2014.

(30) Foreign Application Priority Data

Nov. 7, 2013   (DE) ........................ 10 2013 222 683

(51) Int. Cl.
  *B60R 13/02*    (2006.01)
  *B62D 25/10*    (2006.01)
  *B62D 25/12*    (2006.01)

(52) U.S. Cl.
  CPC ........ *B62D 25/105* (2013.01); *B60R 13/0206* (2013.01); *B62D 25/12* (2013.01)

(58) Field of Classification Search
  CPC .... B62D 25/105; B62D 25/12; B60R 13/0206
  (Continued)

(56) References Cited

U.S. PATENT DOCUMENTS 2,733,096 A * 1/1956 waterhouse ............ B62D 23/00
                                                    180/90
4,363,510 A   12/1982 Burst et al.
(Continued)

FOREIGN PATENT DOCUMENTS

DE       29 41 018 C2    2/1985
DE       196 19 164 A1   11/1997
(Continued)

OTHER PUBLICATIONS

International Search Report (PCT/ISA/210) issued in PCT Application No. PCT/EP2014/073997 dated Jan. 30, 2015 with English translation (Six (6) pages).
(Continued)

*Primary Examiner* — Pinel Romain
(74) *Attorney, Agent, or Firm* — Crowell & Moring LLP

(57) ABSTRACT

A lid for a motor vehicle has at least one body shell part, having at least one trim part which is held on the body shell part and by which the body shell part is covered at least in regions, and at least one fastening element which is arranged on the trim part and to which a coupling element can be fastened. Via the coupling element a covering element of the motor vehicle can be moved together with the lid during a movement of the lid. The trim part includes at least one receiving element which penetrates a corresponding receiving opening of the body shell part and in which the integral fastening element which penetrates the receiving opening is received at least partially with fixing of the trim part on the body shell part via the receiving element.

12 Claims, 2 Drawing Sheets

(58) Field of Classification Search
USPC .......................................................... 296/76
See application file for complete search history.

(56) References Cited

U.S. PATENT DOCUMENTS

| | | | | | |
|---|---|---|---|---|---|
| 4,497,516 | A * | 2/1985 | Morita | .................... | B62D 25/04 24/289 |
| 5,544,928 | A * | 8/1996 | Mori | ...................... | B60J 3/0217 296/187.05 |
| 6,412,852 | B1 * | 7/2002 | Koa | .................... | B60R 13/0206 296/146.5 |
| 6,886,874 | B2 * | 5/2005 | Abe | ........................ | B60R 13/00 296/1.08 |
| 7,766,406 | B2 * | 8/2010 | Galicia | ................. | B60R 13/011 296/1.09 |
| 8,322,001 | B2 * | 12/2012 | Ehrhardt | ............. | B60R 13/0206 24/289 |
| 8,769,779 | B2 * | 7/2014 | Lee | .................... | B60R 13/0206 24/292 |
| 8,876,186 | B2 * | 11/2014 | Huelke | ................. | B62D 21/15 296/187.05 |
| 8,910,991 | B2 * | 12/2014 | Mildner | .................... | F16B 5/12 296/72 |
| 9,040,152 | B2 * | 5/2015 | Schafer | .............. | B60R 13/0206 156/308.2 |
| 9,290,134 | B2 * | 3/2016 | Renke | ................. | B60R 13/0206 |
| 9,302,569 | B2 * | 4/2016 | Ogino | .................... | B60J 5/0418 |
| 9,393,971 | B2 * | 7/2016 | Biadatz | ................ | B61D 17/043 |
| 2004/0155483 | A1 | 8/2004 | Lin et al. | | |
| 2012/0119531 | A1 * | 5/2012 | Osterhout | ............. | B60R 13/025 296/1.08 |
| 2012/0119532 | A1 * | 5/2012 | She | ........................ | B60R 13/025 296/1.08 |
| 2015/0232130 | A1 * | 8/2015 | Colombo | ............. | F16B 5/0657 403/14 |

FOREIGN PATENT DOCUMENTS

| | | |
|---|---|---|
| DE | 196 52 912 A1 | 7/1998 |
| DE | 10 2005 006 432 A1 | 8/2006 |
| DE | 10 2007 039 097 B3 | 8/2008 |
| EP | 1 057 697 A2 | 12/2000 |
| EP | 2 210 781 A1 | 7/2010 |
| EP | 2 261 516 A1 | 12/2010 |
| FR | 2 959 461 A1 | 11/2011 |

OTHER PUBLICATIONS

German-language Written Opinion (PCT/ISA/237) issued in PCT Application No. PCT/EP2014/073997 dated Jan. 30, 2015 (Five (5) pages).

German-language Search Report issued in counterpart German Application No. 10 2013 222 683.7 dated Feb. 28, 2014 with partial English translation )Ten (10) pages).

* cited by examiner

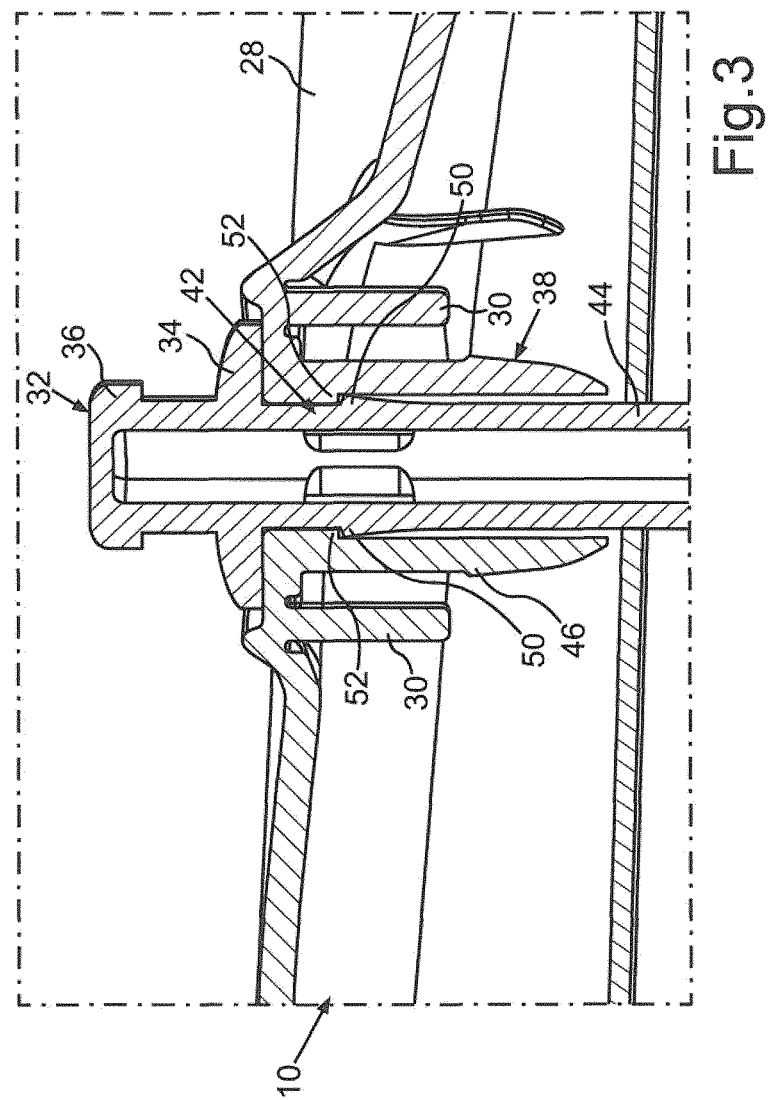

LID, IN PARTICULAR TRUNK LID FOR A MOTOR VEHICLE, IN PARTICULAR A PASSENGER CAR

CROSS REFERENCE TO RELATED APPLICATIONS

This application is a continuation of PCT International Application No. PCT/EP2014/073997, filed Nov. 7, 2014, which claims priority under 35 U.S.C. §119 from German Patent Application No. 10 2013 222 683.7, filed Nov. 7, 2013, the entire disclosures of which are herein expressly incorporated by reference.

BACKGROUND AND SUMMARY OF THE INVENTION

The invention relates to a lid, in particular a trunk lid, for a motor vehicle, in particular a passenger car.

Lids of this type are sufficiently known from mass vehicle production, in particular in the form of trunk lids. Such a trunk lid usually is a rear lid, which is arranged at the rear of the passenger car. The trunk lid or rear lid is used to at least partially close a stowage compartment of the passenger car, wherein the stowage compartment is usually also referred to as the trunk.

The lid is held on the structure, in particular on the body, of the motor vehicle so as to pivot relative to the structure. The lid can be pivoted, for example, between a closed position closing the stowage compartment at least in a sub-region and an open position exposing the stowage compartment in the sub-region.

FIG. 1 shows a sectional, partially cut perspective view of such a lid denoted overall by reference numeral 10 in the form of a rear lid according to the related art. The lid 10 has a shell part 12, which is made of a metallic material, for example. The lid furthermore has at least one trim part 14 held on the shell part 12. The shell part 12 is at least partially clad by way of the trim part 14. The shell part 12 is designed as a sheet metal part, for example. The shell part 12 includes a through-passage 16 into which a spread nut 18 is inserted. A fastening element 20 is arranged on the trim part 14, wherein the fastening element 20 is fastened to the trim part 14 by way of a screw 22. The screw 22 passes through the fastening element 20, a through-passage 24 of the trim part 14, and the through-passage 16, and is screwed into the spread nut 18.

The fastening element 20 has a seat 26 in which a coupling element can be at least partially arranged. The coupling element is a cord, for example. The cord has an eye at one end, by way of which the cord can be suspended in the seat 26 and thereby fastened to the fastening element 20. At the other end, the cord is coupled, or can be coupled, to a cover element, for example, in the form of a rear shelf of the motor vehicle. The rear shelf can likewise be pivoted between a closed position and at least one open position relative to the structure of the motor vehicle, wherein a sub-region of the stowage compartment is covered by the rear shelf when the same is in the closed position and is exposed when the rear shelf is in the open position.

If the lid 10 is now pivoted from the closed position thereof into the open position thereof, for example, the rear shelf is at the same time pivoted from the closed position thereof into the open position thereof because the rear shelf is coupled via the cord to the lid 10. In other words, the rear shelf can be moved together with the lid 10 during a movement of the latter via the coupling element (cord).

For the fastening element 20 to be able to absorb the forces required for moving the rear shelf, the fastening element 20 is screwed against the shell part 12 by way of the screw 22 and via the spread nut 18. As is apparent from FIG. 1, this, however, results in a large number of parts and therefore a high weight and complex assembly.

It is therefore the object of the present invention to refine such a lid in a way to avoid these problems.

This and other objects are achieved by a lid for a motor vehicle comprising at least one shell part, at least one trim part which is held on the shell part and with which the shell part is at least regionally clad, and at least one fastening element, which is arranged on the trim part and on which a coupling element, via which a cover element of the motor vehicle can be moved together with the lid during movement of the latter, can be fastened. The trim part comprises at least one receiving element extending through a corresponding receiving opening of the shell part. A one-piece fastening element extends through the receiving opening and is at least partially accommodated in this receiving opening, fixing the trim part on the shell part via the receiving element.

So as to refine a lid, in particular a trunk lid, for a motor vehicle, in particular a passenger car of the type described above, in such a way that a reduction in weight, a lower number of parts and simpler assembly can be achieved, it is provided according to the invention that the trim part comprises at least one receiving element, which extends through a corresponding receiving opening of the shell part. A one-piece fastening element is at least partially accommodated in the receiving element, fixing the trim part to the shell part via the receiving part, wherein the fastening element also extends through the receiving opening of the shell part. In other words, by accommodating the fastening element in the receiving element, or by introducing the fastening element into the receiving element, for example as part of an assembly operation, a fixation of the trim part to the shell part is created, within the scope of which the trim part is fixed to the shell part via the receiving element. This is achieved, for example, in such a way that wall regions of the receiving element are pushed outwardly by the fastening element against the wall regions of the shell part which delimit the receiving opening.

The fastening element therefore fulfills at least a dual function. On the one hand, it is used to fasten the coupling element so that the cover element can be moved together with the lid via the fastening element and the coupling element. On the other hand, the fastening element is used to fix the trim part to the shell part. By appropriately arranging the fastening element and fixing the trim part to the shell part, the fastening element is able to absorb the forces that are required to move the cover element particularly well, brace them, and transfer them particularly well via the receiving element or the trim part to the shell part. In this way, it is possible to absorb even very high forces without damage.

In a particularly advantageous embodiment of the invention, the fastening element is latchingly engaged with the trim part. In other words, a positive connection of the fastening element to the trim element is provided. As a result of this latching engagement, the fastening element is held particularly securely on the trim part, so that it can also absorb particularly high forces without detaching from the trim part.

It has been found to be particularly advantageous when the trim part is positively and/or non-positively connected to the shell part via the receiving element. This means that it is preferably provided that the accommodation of the fastening element in the receiving element brings about a positive and/or non-positive connection of the trim part to the shell part. The trim part is therefore held particularly securely on the shell part, so that it is also possible to absorb and brace particularly high forces without resulting in undesirable relative movements of the trim part with respect to the shell part.

To implement a particularly stable fastening of the trim part to the shell part, it is provided in a further embodiment of the invention that the receiving part latches over at least one wall region of the shell part which at least partially delimits the receiving opening. For this purpose, the receiving element includes a flange having an undercut, which extends through and latches over the shell part.

So as to keep the weight of the lid particularly low, the trim part is preferably made of a plastic material. As an alternative or in addition, the fastening element is made of a plastic material, so that a particularly low weight can be implemented.

The fastening element can be assembled particularly easily because it must only be introduced into the receiving element. The assembly of further, separate parts is not provided and not necessary. At the same time, the coupling element can be fastened to the trim part via the fastening element in a particularly secure and stable manner.

The lid is preferably designed as a trunk lid, in particular as a rear lid, for at least partially closing a stowage compartment, in particular a trunk, of the motor vehicle. It is therefore possible, for example, that a rear shelf, serving as the cover element, can be moved together with the lid via the fastening element and the coupling element.

The invention also covers a motor vehicle, in particular a passenger car, having a lid according to the invention. Advantageous embodiments of the lid according to the invention shall be regarded as advantageous embodiments of the motor vehicle according to the invention, and vice versa.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 sectional schematic view of the lid according to FIG. 2.

In the figures, identical or functionally equivalent elements are denoted by the same reference numerals.

DETAILED DESCRIPTION OF THE DRAWINGS

Figure 1:
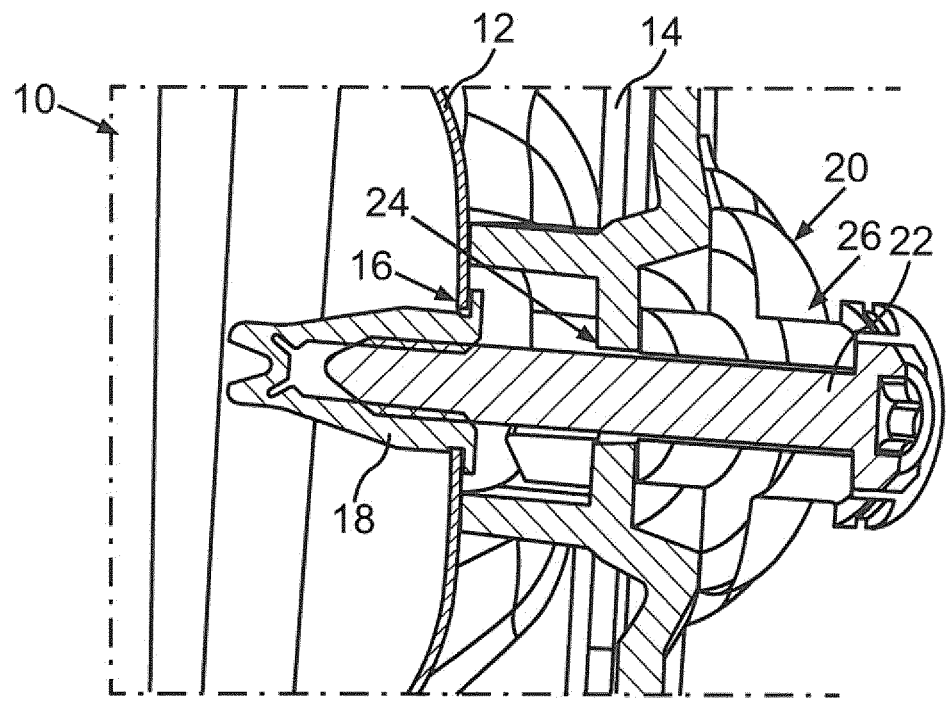
FIG. 1 is a sectional, schematic and cut, perspective view of a lid for a motor vehicle, comprising a shell part, a trim part held on the shell part, and a fastening element, which is arranged on the trim part and to which a coupling element can be fastened, by way of which a cover element of the motor vehicle can be moved together with the lid during movement of the same.
Figure 2:
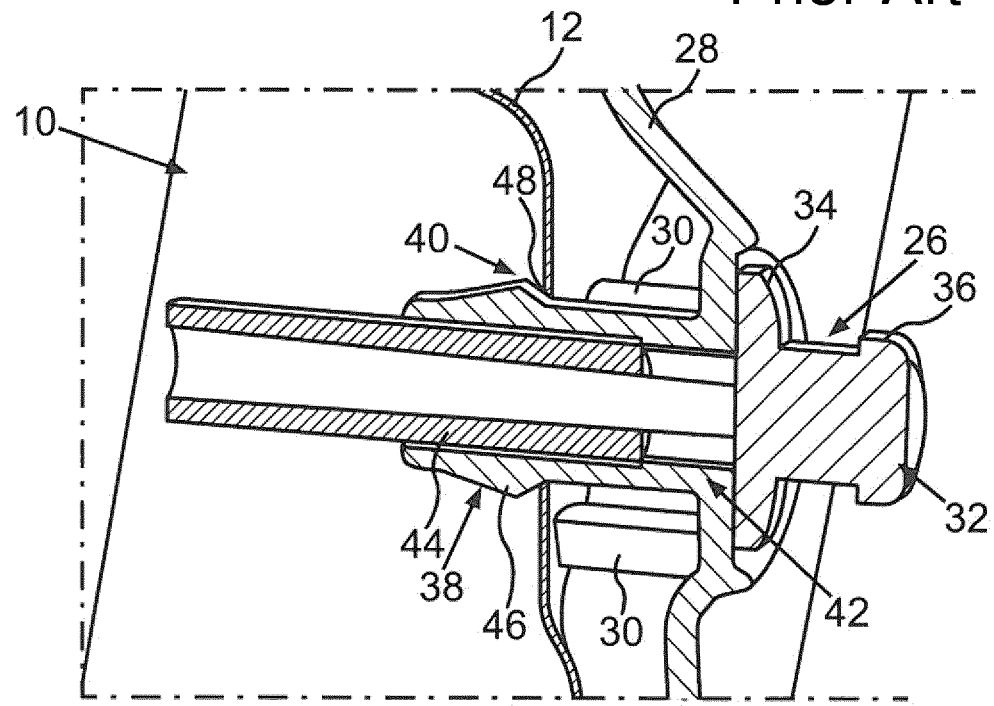
FIG. 2 is a sectional, schematic and cut, perspective view of a lid according to an embodiment of the invention.

FIG. 2 shows a lid 10 for a motor vehicle, in particular a passenger car. The description with respect to the lid 10 according to FIG. 1 can be readily applied to the lid 10 according to FIGS. 2 and 3 with respect to the function of the same. The lid 10 can therefore be a trunk lid, in particular a rear lid, which is held on the structure, in particular on the body of the motor vehicle so as to pivot relative to the structure. The lid 10 is used, for example, to close at least a sub-region of a stowage compartment, in particular a trunk, of the motor vehicle and can be moved between a closed position closing the stowage compartment at least in a sub-region and at least one open position exposing the sub-region.

The motor vehicle furthermore comprises a cover element in the form of a rear shelf. As was already described with respect to FIG. 1, the rear shelf can likewise be pivoted between a closed position and at least one open position relative to the structure, for example. At least one coupling element is provided so as to move the rear shelf together with the lid 10 during pivoting of the latter. Preferably at least two lateral coupling elements are provided. Such a coupling element is a cord, for example, which is connected to the rear shelf at one end and to the lid 10 at the other.

The lid 10 according to FIGS. 2 and 3 comprises a shell part 12, which is made of a metallic material, for example. The shell part 12 can be designed as a sheet metal part. Alternatively, it is possible for the shell part 12 to be made of a fiber-reinforced plastic material. The fiber-reinforced plastic material can be carbon fiber reinforced plastic (CFRP). The shell part 12 can be made of sheet molding compound (SMC) or bulk molding compound (BMC).

The lid 10 according to FIGS. 2 and 3 furthermore comprises a trim part 28 with which the shell part 12 is at least partially clad. The trim part 28 is made of a plastic material, for example. The trim part 28 comprises spacer elements 30, which are in a support position with the shell part 12 and therefore hold at least a sub-region of the trim part 28 at a distance from the shell part 12.

The lid 10 also comprises at least one fastening element 32 arranged on the trim part 28. The aforementioned coupling element can be fastened to the fastening element 32 so that the rear shelf is moved together with the lid 10 via the fastening element 32 and the coupling element, in particular when the lid 10 is being opened.

So as to securely hold the coupling element, the fastening element 32 comprises a seat 26, which is delimited in the longitudinal extension direction of the fastening element 32 by a first collar 34 and by a second collar 36 of the fastening element 32. As is apparent from FIGS. 2 and 3, the fastening element 32 is supported on the trim part 28 via the collar 34.

The trim part 28 comprises a receiving element 38, which passes through or extends through a corresponding receiving opening 40 of the shell part 12, which is designed as a through-passage. The receiving element 38 comprises a receiving opening 42, which is designed as a through-passage and in which the fastening element 32 is partially accommodated. As is apparent from FIGS. 2 and 3, a shaft 44 of the fastening element 32 extends through the receiving opening 42. The shaft 44 furthermore also extends through the receiving opening 40 of the shell part 12 designed as a through-passage.

The receiving element 38 has a flange 46, which is designed as a flange having an undercut and latches over a wall region 48 of the shell part 12 which delimits the receiving opening 40. In this way, a positive mount of the trim part 28 on the shell part 12 by way of the receiving element 38 is created.

The fastening element 32 accommodated in the receiving opening 42 pushes the walls of the receiving element 38 which delimit the receiving opening 42 in the radial direction outwardly against the wall region 48, so that the flange 46 cannot move inwardly away from the wall region 48 in the radial direction and thereby cancel the engagement. In other words, the one-piece fastening element 32 which extends through the receiving opening 40 and is made of a plastic material, for example, is accommodated at least partially in the receiving element 38 or the receiving opening 42 via the receiving element 38, fixing the trim part 28.

Within the scope of the assembly of the lid 10, the fastening element 32 designed as a one-piece receiving pin is pushed into the trim part 28 or through the receiving opening 42 and latchingly engages with the trim part 28. For this purpose, the shaft 44—as is apparent particularly well from FIG. 3—includes catch lugs 50, which latch over corresponding wall regions 52 delimiting the receiving opening 42 in a spring-loaded fashion. The fastening element 32 is therefore latchingly engaged with the trim part 28. Because the fastening element 32 pushes the flange 46 behind the wall region 48, the fastening element 32 also brings about a positive and/or non-positive connection of the trim part 28 to the shell part 12. In this way, forces that are transmitted by the rear shelf via the coupling element to the fastening element 32 can be transferred particularly well from the fastening element 32 to the receiving element 38 and then to the shell part 12. The trim part 28 can therefore have only a very low weight because the load can be dissipated at least substantially directly into the shell part 12. The trim part 28 is not loaded, or is loaded only to a very small degree, but rather supported. Moreover, very simple assembly that is favorable in terms of time and cost can be achieved because the fastening element 32 merely must be inserted into the receiving element 38. The assembly of further, separate components is not provided and not necessary.

LIST OF REFERENCE NUMERALS

10 lid
12 shell part
14 trim part
16 through-passage
18 spread nut
20 fastening element
22 screw
24 through-passage
26 seat
28 trim part
30 spacer element
32 fastening element
34 collar
36 collar
38 receiving element
40 receiving opening
42 receiving opening
44 shaft
46 flange
48 wall region
50 catch lug
52 wall region The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lid for a motor vehicle, comprising:
   a shell part;
   a trim part held on the shell part and with which the shell part is clad at least regionally; and
   a fastening element arranged on the trim part, the fastening element being configured to have secured thereto a coupling element by which a cover of the motor vehicle is movable together with the lid during movement of the lid, wherein
   the shell part has a receiving opening,
   the trim part has a receiving element configured to extend through the receiving opening of the shell part, and
   the fastening element is a one-piece fastening element received at least partially in the receiving element of the trim part and penetrating the receiving opening of the shell part upon fixing the trim part on the shell part via the receiving element.

2. The lid according to claim 1, wherein the fastening element latchingly engages with the trim part.

3. The lid according to claim 1, wherein the trim part is positively and/or non-positively connected to the shell part via the receiving element of the trim part.

4. The lid according to claim 2, wherein the trim part is positively and/or non-positively connected to the shell part via the receiving element of the trim part.

5. The lid according to claim 1, wherein the receiving element latches over a wall region of the shell part, said wall region at least partially delimiting the receiving opening of the shell part.

6. The lid according to claim 4, wherein the receiving element latches over a wall region of the shell part, said wall region at least partially delimiting the receiving opening of the shell part.

7. The lid according to claim 1, wherein the trim part is made of a plastic material.

8. The lid according to claim 7, wherein the fastening element is made of a plastic material.

9. The lid according to claim 1, wherein the fastening element is made of a plastic material.

10. The lid according to claim 1, wherein the lid is a trunk lid configured to close a stowage compartment of the motor vehicle.

11. A motor vehicle, comprising:
    a lid, the lid comprising:
      a shell part;
      a trim part held on the shell part and with which the shell part is clad at least regionally; and
      a fastening element arranged on the trim part, the fastening element being configured to have secured thereto a coupling element by which a cover of the motor vehicle is movable together with the lid during movement of the lid, wherein
      the shell part has a receiving opening,
      the trim part has a receiving element configured to extend through the receiving opening of the shell part, and
      the fastening element is a one-piece fastening element received at least partially in the receiving element of the trim part and penetrating the receiving opening of the shell part upon fixing the trim part on the shell part via the receiving element.

12. The motor vehicle according to claim 11, wherein the motor vehicle is a passenger car.

\* \* \* \* \*